Patented June 22, 1943

2,322,281

UNITED STATES PATENT OFFICE 2,322,281

SEPARATION OF PIPERYLENE ISOMERS

David Craig, Silver Lake Village, Ohio, assignor to The B. F. Goodrich Company, New York, N. Y., a corporation of New York No Drawing. Application January 20, 1942, Serial No. 427,462

4 Claims. (Cl. 260—681.5)

This invention relates to the treatment of piperylenes, and particularly to a method whereby piperylene may be separated into its geometric isomers.

I have discovered that piperylene as it is often obtained, by the high temperature pyrolysis of gas oil for instance, exists in the form of two geometric isomers having the following constants:

| B. P.$_{740}$ | $n_D^{20}$ | $D_{20}^{20}$ |
|---|---|---|
| 43.6° C.±0.2° | 1.4360 | 0.6921 |
| 41.5° C.±0.2° | 1.4300 | 0.6784 |

The high-boiling isomer is believed to be cis-piperylene, the low-boiling isomer trans-piperylene. It is practically impossible to separate these geometric isomers in even a very efficient fractionating column because of the proximity of the boiling points. Attempts to separate the isomers by chemical means are sometimes useless because certain reactions, the formation of the monomeric sulfone for instance, alters the cis-piperylene so that it is recovered by decomposition of the sulfone in the trans form.

I have now discovered that cis-piperylene and trans-piperylene may be separated from a mixture containing a predominant amount of either isomer by a process which comprises the formation of piperylene complexes with salts of heavy metals of groups I and II of the periodic system. When the complexes are formed from a mixture containing approximately equal parts by weight of the piperylene isomers, decomposition of the complexes yields a mixture containing the isomers in substantially unaltered proportions. When a mixture containing a predominant amount of either isomer is similarly treated, however, the fraction first obtained by the decomposition of the complexes contains a mixture of isomers in more nearly equal proportions than the original mixture. The subsequent fractions, and particularly the fraction collected after most of the mixture of complexes has been decomposed, consist of the piperylene isomer which was predominant in the original mixture in a purified form. The best results are obtained when the starting material contains the piperylene isomers in a ratio of 2:1 or higher.

The methods by which diolefins may be reacted with salts of heavy metals of groups I and II of the periodic system, particularly cuprous halides such as cuprous chloride or cuprous bromide, are well known, and both piperylene isomers react to form complexes in the same manner as butadiene and isoprene. Thus when a mixture of cis- and trans-piperylene is introduced into a solution of cuprous chloride in aqueous ammonium chloride or hydrochloric acid, the complex precipitates in solid form. If desired, cuprous chloride may be deposited on a fibrous, nonabsorbent carrier such as asbestos or sawdust, and liquid piperylene may be passed thereover. The complexes may be decomposed by heating and/or lowering the pressure. Various additional details of separating procedures are disclosed in U. S. Patents 1,795,549, 1,999,159 and 2,188,899, and will not be repeated here since they form no part of the present invention.

As a specific example of the method of this invention, 68 g. of a mixture of hydrocarbons containing 75% of cis-piperylene and 25% of trans-piperylene were added with stirring to a cuprous ammonium chloride solution made by dissolving 100 g. of cuprous chloride and 200 g. of ammonium chloride in a mixture of 575 g. of water and 25 g. of concentrated hydrochloric acid and containing a small piece of copper wool to reduce any cupric chloride formed. The piperylene complexes in the form of light yellow solids began to precipitate immediately. The mixture was stirred for three hours at a temperature of 25° C. The temperature was then raised until the complexes began to decompose with the liberation of a mixture of about equal parts of cis- and trans-piperylene. In the temperature range of from 61° to 66° C. the amount of cis-piperylene in the mixture of isomers being liberated rapidly rose until the mixture contained about 89% of cis-piperylene. As the temperature was further increased to 100° C., the purity of the cis-piperylene rose until a practically pure product was being evolved.

In another specific example the complexes were formed in the same manner as above, and were then isolated by filtration. When the mixture of complexes was decomposed by heating, the sample of distillate collected from 40° to 63° C. consisted of cis- and trans-piperylene in approximately equal proportions, and the distillate collected at from 63° to 104° C. consisted of cis-piperylene containing a little trans-piperylene. A considerable, although not complete, purification of cis-piperylene was obtained by this process. A more highly purified product can be obtained by repeating the process and employing the purified cis-piperylene as the starting material.

When a mixture of piperylene isomers containing predominantly trans-piperylene is treated by the method of this invention purified trans-piperylene may be obtained as a product. As a specific example a mixture of isomers containing 75% of trans-piperylene and 25% of cis-piperylene was treated as in the first example above. The first fractions obtained by the decomposition of the complexes were poorer in trans-piperylene than the starting material, while the last fractions contained a higher percentage of trans-piperylene than the starting material.

The process herein described is useful not only for separating the isomeric piperylenes from each other but also from admixture with other saturated or unsaturated hydrocarbons. Cis-piperylene and cyclopentene, for instance, form a constant boiling material which is difficult to resolve. When a mixture of cis-piperylene and cyclopentene is subjected to the treatment herein described, the cyclopentene distills from the reaction mixture before appreciable decomposition of the piperylene complex occurs, and the subsequent decomposition of the complex yields cis-piperylene practically free from cyclopentene. A similar process can be employed to obtain cis-piperylene from admixture with trans-piperylene and cyclopentene.

Although I have herein disclosed specific embodiments of the invention, I do not intend to limit the invention solely thereto, for many variations and modifications which will be apparent to those skilled in the art are within the spirit and scope of the invention as defined in the appended claims.

I claim:

1. The method which comprises reacting a mixture of isomeric piperylenes containing a substantially larger amount of one isomer than of the other with a salt of a heavy metal of group I and II of the periodic system to form a mixture of complexes, partially decomposing the mixture of complexes to liberate a mixture of piperylenes containing less of the isomer originally present in the substantially larger amount than the initial mixture, separating the mixture of piperylenes so liberated from the undecomposed complexes, and then continuing the decomposition to liberate a mixture containing more of the isomer originally present in the substantially larger amount than the initial mixture.

2. The method which comprises reacting a mixture of isomeric cis and trans piperylenes containing a substantially larger amount of cis-piperylene than of trans-piperylene with a cuprous halide to form a mixture of cuprous chloride complexes, heating the mixture of complexes to liberate a mixture of piperylenes containing approximately equal proportions of the isomers, separating the mixture of piperylenes so liberated, and then continuing the heating to liberate a material containing a higher proportion of cis-piperylene than the initial mixture.

3. The method which comprises reacting a mixture of isomeric piperylenes containing a substantially larger amount of one isomer than of the other with cuprous chloride to form a mixture of cuprous chloride complexes, heating the mixture of complexes to liberate a mixture of piperylenes containing approximately equal proportions of the isomers, separating the mixture of piperylenes so liberated, and then continuing the heating to liberate a material containing more of the predominant isomer originally present in the substantially larger amount than the initial mixture.

4. The method which comprises reacting a mixture comprising isomeric piperylenes in a ratio of at least two parts of one isomer to one part of the other isomer with cuprous chloride to form a mixture of cuprous chloride complexes, heating the mixture of complexes to liberate a mixture comprising piperylenes in a ratio of less than two parts of said one isomer to one part of said other isomer, separating the mixture of piperylenes so liberated, and then continuing the heating to liberate a material comprising piperylenes in a ratio of more than two parts of said one isomer to one part of said other isomer.

DAVID CRAIG.